No. 750,699. PATENTED JAN. 26, 1904.
B. J. RAGATZ.
HANDLE FOR BASKETS.
APPLICATION FILED SEPT. 28, 1903.
NO MODEL.
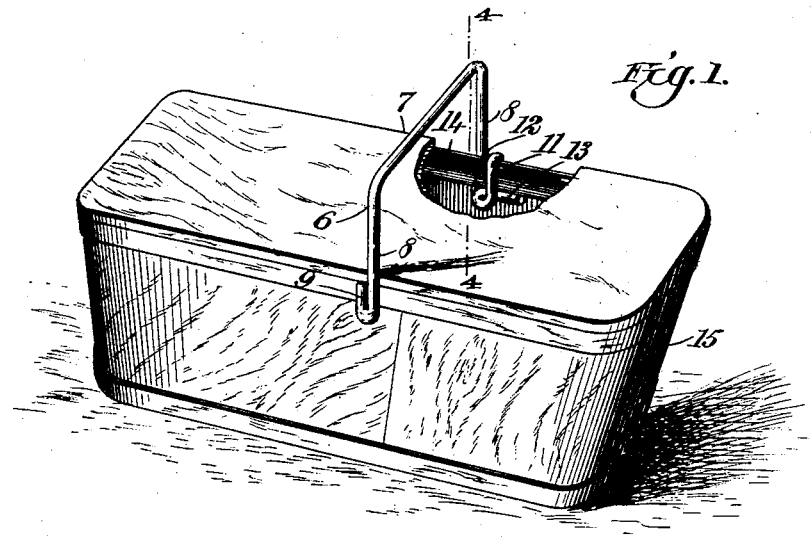
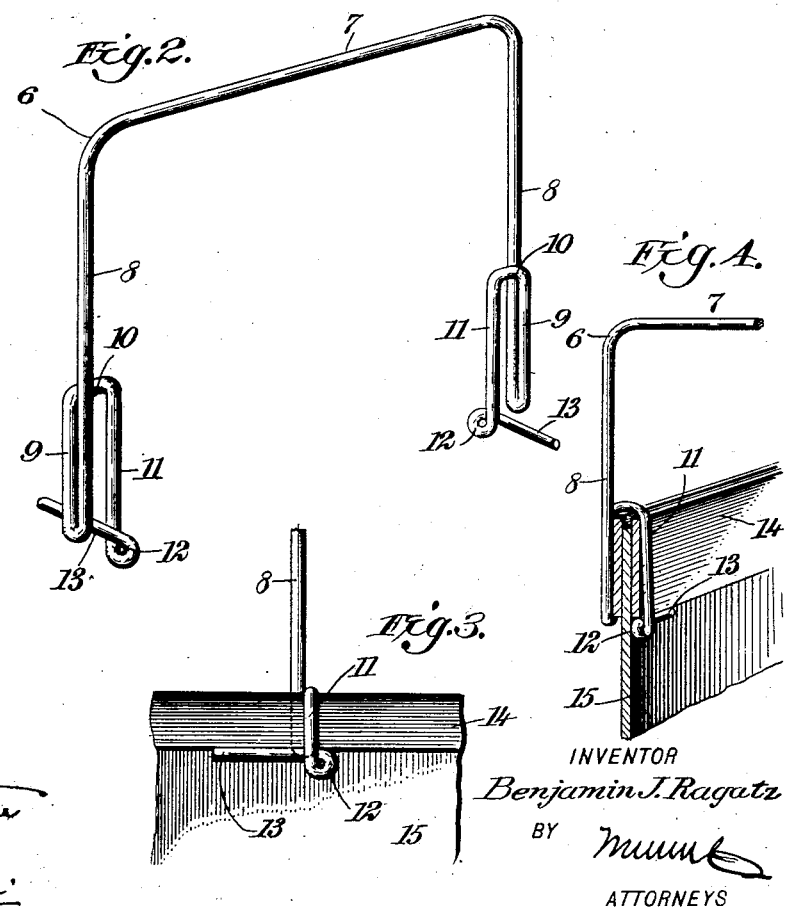
WITNESSES:
Paul Hunter
W. H. Reid.
INVENTOR
Benjamin J. Ragatz
BY
ATTORNEYS No. 750,699.

Patented January 26, 1904.

UNITED STATES PATENT OFFICE.

BENJAMIN J. RAGATZ, OF ST. JOSEPH, MICHIGAN.

HANDLE FOR BASKETS.

SPECIFICATION forming part of Letters Patent No. 750,699, dated January 26, 1904.

Application filed September 28, 1903. Serial No. 174,895. (No model.)

*To all whom it may concern:*

Be it known that I, BENJAMIN J. RAGATZ, a citizen of the United States, and a resident of St. Joseph, in the county of Berrien and State of Michigan, have invented new and useful Improvements in Handles for Baskets, of which the following is a full, clear, and exact description.

This invention relates to a handle that may be readily attached to and removed from a basket or the like.

The object of this invention is to provide an improved form of handle that can be quickly and easily applied to the top edge of a basket having on one or both sides a reinforcing-strip.

Broadly stated, my invention comprises a rod having at one or both ends for attachment to a basket or the like a substantially U-shaped portion with parallel sides lying in close proximity and one of said sides having at its lower portion a projection arranged to engage under the supporting-strip at the top of the basket.

Reference is to be had to the accompanying drawings, forming a part of this specification, in which similar characters of reference indicate corresponding parts in all the figures.

Figure 1 is a perspective view showing a handle embodying my invention as applied to a basket, a portion of the cover of the basket being broken away to more clearly show the manner of attaching the handle. Fig. 2 is a perspective view of the handle detached. Fig. 3 is a partial side view showing the handle in place on the basket; and Fig. 4 is a sectional perspective view on the line 4 4 in Fig. 1, showing the handle in place on the basket.

Referring now to the several views in the drawings, the handle 6 is preferably formed of a stiff wire or rod having a grip portion 7 and the two upright basket-engaging portions 8. The end of each portion 8 is first returned or bent upon itself, as indicated at 9, in a plane parallel with the side of the basket. Thereupon the rod is bent at a right angle and toward the opposite member 8, as at 10. Next the rod is bent downward parallel with the portion 8 to a point below the lower end of the portion 9, and the end of the portion 11 is given a curve or twist 12, so that the end 13 lies at right angles to the portion 8 and also to the U-shaped portion composed of the parts 9, 10, and 11, and also lies inside of said U-shaped portion. In the act of applying the handle the two legs of the U-shaped portion are bent apart and are then passed over the edge of the basket until the end portion 13 comes underneath the lower edge of the supporting-strip 14 of the basket 15. It will be observed from Figs. 3 and 4 that this end portion 13 will lie snugly throughout its length both against the side of the basket 15 and against the lower edge of the strip 14, which will securely retain the handle in engagement with the basket.

The strips 13 on each side preferably project in opposite directions, as shown in Fig. 2, and hence will effectually resist the bending of the handle toward either end of the basket, as this motion in either direction would tend to cause one part, 13, to swing on the part 11 at the bend 12.

It will be observed that this form of handle can be readily attached to any basket or a like receptacle having a longitudinal strip corresponding to the strip 14 upon the inside of the basket, or should the strip be located on the outside of the basket the construction is slightly altered by having the U-shaped bend extend outwardly from the handle instead of inwardly. Furthermore, it will be seen that there are no sharp prongs or other parts to disfigure the basket and that no tools whatever are necessary for the attachment of the handle to the basket. It will also be seen that the device is constructed simply by giving a certain number and variety of bends to a single bar or rod and that no sharp points or other irregularities are presented.

Having thus described my invention, I claim as new and desire to secure by Letters Patent—

1. A basket-handle, comprising a rod bent to form a bail and having at each end a substantially U-shaped bend, opening downward and having its parallel legs in close proximity and arranged to engage both sides of a basket at the upper edge of the same, the free leg of said bend having its lower end extending horizontally and projecting into the U-shaped member.

2. A basket-handle, comprising a rod bent to form a bail and having at each end a substantially U-shaped bend, opening downward, the bend having parallel legs lying in close proximity and arranged to engage both sides of the edge of a basket at its upper portion, the free extremity of said U-shaped portion being bent to lie at a right angle with the plane of the U-shaped member and also at a right angle to the leg of said member, and also projecting inside of the U-shaped bend.

3. A basket-handle made from a single rod having at each end a U-shaped section opening downward, said section having vertical parallel sides lying in close proximity to each other and adapted to receive between them one side of the basket at its top edge, one of the legs of each U-shaped member being bent upon itself at its lower extremity a short distance from the end of the rod, with the extreme end portions of the rod each lapping the inner side of the leg to which it is connected and extending in a horizontal direction, one forwardly and the other rearwardly with respect to the longitudinal extent of the basket to which the handle is to be attached.

4. A basket-handle having at its ends U-shaped sections opening downwardly each of said sections having its sides lying in close proximity to each other and adapted to receive between them one side of the basket at its top edge, one of the legs of each U-shaped member being bent upon itself at its lower end to form a horizontal section lapping the inner side of the leg to which it is connected, these two terminal sections extending one forwardly and the other rearwardly with respect to the longitudinal extent of the basket to which the handle is to be attached.

5. A basket-handle, comprising a rod bent into the form of a handle and terminating at its ends in rigid integral clamping-sections U-shaped in form, opening downwardly and extending transversely in direction of each other, the outer leg of each of said U-shaped members being connected at its lower end directly to the end of the handle proper and lying in parallel engagement with said end to form the outer leg of each U-shaped member double, said double-leg sections each lying in a vertical plane at right angles to the plane occupied by the main body-section of the handle, and the inner leg of each U-shaped member being bent upon itself at its lower extremity near the end of the rod, with the extreme end portions of the rod each lapping the inner side of the leg to which it is connected and extending in a horizontal direction.

6. A basket-handle, comprising a rod bent into the form of a handle and terminating at its ends in rigid integral clamping-sections U-shaped in form, opening downwardly and extending transversely in direction of each other, the outer leg of each of said U-shaped members being connected at its lower end directly to the end of the handle proper and lying in parallel engagement with said end to form the outer leg of each U-shaped member double, said double-leg sections lying in planes parallel with each other and disposed at right angles to the plane occupied by the main body-section of the basket-handle, the outer leg of one U-shaped member being at one side of said latter plane and the outer leg of the other U-shaped member being at the opposite side of said plane, the inner leg of each U-shaped member being bent upon itself at its lower extremity near the end of the rod, with the extreme end portions of the rod each lapping the inner side of the leg to which it is connected and extending horizontally in opposite directions.

In testimony whereof I have signed my name to this specification in the presence of two subscribing witnesses.

BENJAMIN J. RAGATZ.

Witnesses:
LAWRENCE C. FIFE,
IRA NIECE.